US012695400B2

(12) United States Patent
Kauffmann et al.

(10) Patent No.: US 12,695,400 B2
(45) Date of Patent: Jul. 28, 2026

(54) NETWORK-CONNECTED TOY WAND SYSTEM WITH LEVITATION-INDUCING CRADLE

(71) Applicant: Google LLC, Mountain View, CA (US)

(72) Inventors: Alejandro Kauffmann, San Francisco, CA (US); Adam James Banfield, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 597 days.

(21) Appl. No.: 18/029,544

(22) PCT Filed: Sep. 30, 2020

(86) PCT No.: PCT/US2020/053552
§ 371 (c)(1),
(2) Date: Mar. 30, 2023

(87) PCT Pub. No.: WO2022/071944
PCT Pub. Date: Apr. 7, 2022

(65) Prior Publication Data
US 2023/0364525 A1     Nov. 16, 2023

(51) Int. Cl.
*H02N 15/00*     (2006.01)
*A63J 21/00*     (2006.01)
*H02J 50/10*     (2016.01)

(52) U.S. Cl.
CPC .............. *H02N 15/00* (2013.01); *A63J 21/00* (2013.01); *H02J 50/10* (2016.02)

(58) Field of Classification Search
CPC ............... H02J 9/062; H02J 3/46; H02J 9/066
See application file for complete search history.

(56) References Cited

U.S. PATENT DOCUMENTS

2004/0204240 A1*  10/2004  Barney ................... A63J 21/00
                                                  463/36
2019/0326045 A1*  10/2019  Dudley, Jr. ............. H01F 7/206

FOREIGN PATENT DOCUMENTS

EP        3671718       6/2020
WO      WO2008058562    5/2008
WO     WO-2008058562 A1 *  5/2008    .............. H02J 50/10

OTHER PUBLICATIONS

International Preliminary Report on Patentability for Application No. PCT/US2020/053552, mailed Apr. 13, 2023, 18 pages.

(Continued)

*Primary Examiner* — Daniel Cavallari
(74) *Attorney, Agent, or Firm* — DORITY & MANNING P.A.

(57) ABSTRACT

Systems and devices for levitating interactive objects are provided. A toy wand system can include a toy wand and a cradle. The toy wand can include a shaft portion having at least one magnetically-reactive element inside and a handle. The cradle can be configured to receive and hold the toy wand. The cradle can include a body that is shaped to form an opening therethrough sufficient to accommodate the shaft portion, a solenoid coil formed proximate the opening, electrical circuitry configured to cause an electrical current to flow in the solenoid coil, wireless communication circuitry; and a controller coupled to the wireless communication circuitry and the electrical circuitry and configured to control the timing and amount of electrical current flowing through the solenoid coil to cause levitation or levitation-like movement of the toy wand within said opening by virtue of electromagnetic interaction with the magnetically-reactive element of the shaft portion.

20 Claims, 13 Drawing Sheets

(56)         References Cited

OTHER PUBLICATIONS

International Search Report for Application No. PCT/US2020/
053552, mailed on Jul. 22, 2021, 4 pages.

* cited by examiner

<u>800</u>

RECEIVING, INTO AN OPENING OF A CRADLE, A USER DEVICE    810

RECEIVING AN EXTERNAL COMMAND TO CHARGE THE USER DEVICE    820

CAUSING A FIRST ELECTRICAL CURRENT TO FLOW
TO CAUSE USER DEVICE TO BE RETAINED AT FIRST POSITION    830

CHARGING THE USER DEVICE USING WIRELESS CHARGING    840

CEASING CHARGING OF USER DEVICE    850

CAUSING A SECOND ELECTRICAL CURRENT TO FLOW TO
CAUSE USER DEVICE TO LEVITATE AT ONE OR MORE SECOND POSITIONS    860

RECEIVING, INTO AN OPENING OF A CRADLE, AN INTERACTIVE OBJECT — 910

OBTAINING DATA INDICATIVE OF EVENT — 920

DETERMINING LEVITATION OR LEVITATION-LIKE MOTION SEQUENCE — 930

CONTROLLING SOLENOID COIL TO INDUCE MAGNETIC FIELD TO CAUSE INTERACTIVE OBJECT TO MOVE ACCORDING TO LEVITATION OR LEVITATION- LIKE MOTION SEQUENCE — 940

NETWORK-CONNECTED TOY WAND SYSTEM WITH LEVITATION-INDUCING CRADLE

PRIORITY CLAIM

The present application claims the right of priority under 35 U.S.C. § 371 to International Application No. PCT/US2020/053552 filed on Sep. 30, 2020, which is incorporated by reference herein.

FIELD

The present disclosure relates generally to charging interactive electronic devices. More particularly, the present disclosure relates to a network-connected toy wand and cradle system which can cause the toy wand to levitate.

BACKGROUND

Charging cradles can be used in a variety of applications to charge electronic devices, such as interactive devices. However, charging devices generally retain the electronic device passively in a static position, such as when the electronic device has been inserted into the charging cradle.

SUMMARY

Aspects and advantages of embodiments of the present disclosure will be set forth in part in the following description, or can be learned from the description, or can be learned through practice of the embodiments.

One example aspect is directed to a network-connected toy wand system. The toy wand system can include a toy wand and a cradle. The toy wand can include a shaft portion having at least one magnetically-reactive element inside and a handle. The cradle can be configured to receive and hold the toy wand. The cradle can include a body that is shaped to form an opening therethrough sufficient to accommodate the shaft portion, a solenoid coil formed proximate the opening, electrical circuitry configured to cause an electrical current to flow in the solenoid coil, wireless communication circuitry; and a controller coupled to the wireless communication circuitry and the electrical circuitry and configured to control the timing and amount of electrical current flowing through the solenoid coil. Upon the occurrence of a predetermined event, the controller can cause electrical current to flow in the solenoid coil that causes levitation or levitation-like movement of the toy wand within said opening by virtue of electromagnetic interaction with the magnetically-reactive element of the shaft portion.

Another example aspect is directed to a network-connected interactive object charging system. The network-connected interactive object charging system can include an interactive object. The interactive object can include a casing, a first magnet disposed within the casing. The network-connected interactive object charging system can further include a cradle. The cradle can include a body that is shaped to form an opening therethrough sufficient to accommodate at least a portion of the casing. The cradle can further include a solenoid coil formed around the opening. The cradle can further include electrical circuitry configured to cause an electrical current to flow in the solenoid coil. The cradle can further include a controller coupled to the electrical circuitry for controlling the timing and amount of electrical current flowing through the solenoid coil. The cradle can be configured to impart a first magnetic force such that when the interactive object is positioned within the cradle at a first levitating position, the cradle causes a first magnetically-induced levitation of the interactive object due to the first magnetic force opposing the first magnet of the interactive object. The cradle can be further configured to impart a second magnetic force such that when the interactive object is positioned within the cradle at a second levitating position, the cradle causes a second magnetically-induced levitation of the interactive object due to the second magnet force attracting the first magnet of the interactive object. The controller can be configured to control the electrical current in the solenoid coil to cause the interactive object to move between the first levitating position and the second levitating position.

Another example aspect is directed to a method for charging a user device. The method can include receiving, into an opening of a charging cradle, a user device. The user device can include a casing having at least one magnetically-reactive element inside and charging circuitry. The charging cradle can include a body that is shaped to form the opening therethrough sufficient to accommodate at least a portion of the casing, a solenoid coil formed around the opening, electrical circuitry for causing an electrical current to flow in the solenoid coil, wireless communication circuitry, and a controller coupled to the wireless communication circuitry and the electrical circuitry for controlling the timing and amount of electrical current flowing through the solenoid coil. The method can further include receiving, by the wireless communication circuitry, an external command to charge the user device. The method can further include causing, by the controller, a first electrical current to flow in the solenoid coil thereby causing the user device to be retained at a first position. While the user device is at the first position, the method can further include charging the charging circuitry of the user device. Upon occurrence of an event, the method can further include ceasing charging of the user device. The method can further include causing, by the controller, an electrical current to flow in the solenoid coil thereby causing the user device to levitate within the opening at one or more levitating positions.

Another example aspect is directed to a method for controlling an interactive object. The method can include receiving, into an opening of a cradle, an interactive object. The interactive object can include a casing having at least one magnetically-reactive element inside and charging circuitry. The cradle can include a body that is shaped to form the opening therethrough sufficient to accommodate at least a portion of the casing, a solenoid coil formed around the opening, electrical circuitry for causing an electrical current to flow in the solenoid coil, wireless communication circuitry, and a controller coupled to the wireless communication circuitry and the electrical circuitry for controlling the timing and amount of electrical current flowing through the solenoid coil. The method can further include obtaining, by the controller, data indicative of an event. The event can include an interactive opportunity for a user. The method can further include determining, by the controller, a levitation or levitation-like motion sequence for the interactive object based at least in part on the data indicative of the event. The method can further include controlling, by the controller, the solenoid coil to induce a magnetic field to cause the interactive object to move according to the levitation or levitation-like motion sequence. The levitation or levitation-like motion sequence can be configured to notify a user of the event.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts an example method according to example aspects of the present disclosure;

DETAILED DESCRIPTION

Figure 1A:
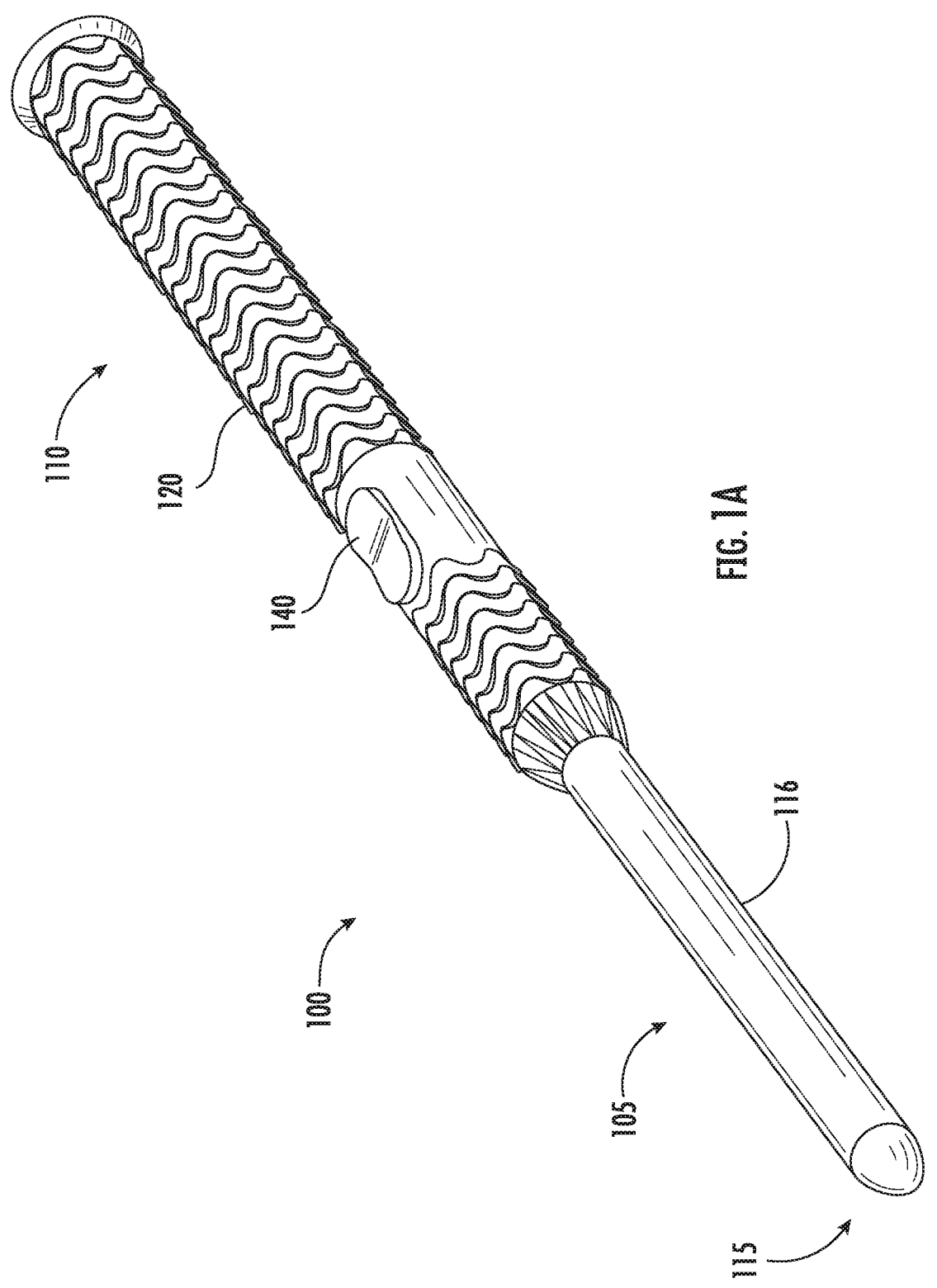
FIGS. 1A-E depict an example interactive object and an example hardware architecture of an interactive object according to example aspects of the present disclosure.

Example aspects of the present disclosure are directed to a network-connected interactive object system which can cause an interactive object (e.g., a toy wand) to levitate at one or more positions. For example, a toy wand can include a shaft portion having at least one magnetically-reactive element inside and a handle. In some implementations, the magnetically-reactive element can include a permanent magnet. A cradle can be configured to receive and hold the toy wand. For example, the cradle can include a body that is shaped to form an opening therethrough sufficient to accommodate the shaft portion. The cradle can further include a solenoid coil formed proximate the opening, such as around the opening, and electrical circuitry for causing an electrical current to flow in the solenoid coil. The cradle can further include wireless communication circuitry and a controller coupled to the electrical circuitry which can control the timing and amount of electrical current flowing through the solenoid coil. Upon the occurrence of a predetermined event, the electrical current can be caused to flow in the solenoid coil that causes levitation or levitation-like movement of the toy wand within the opening by virtue of electromagnetic interaction with the magnetically-reactive element of the shaft portion. For example, in some implementations, the toy wand can be charged by the cradle, and upon completion of charging, the toy wand can be caused to levitate, thereby indicating that charging is complete.

More particularly, the technology of the present disclosure can allow for interactive objects/user devices to levitate in response to various events, thereby providing a "magic-like" levitation effect for a user. As used herein the terms "levitation" and/or "levitation-like movement" refer to an effect in which at least a portion of an interactive object generally floats and/or is suspended within a cradle without requiring physical contact and/or physical support from the cradle to overcome a gravitational force. While incidental physical contact may occur during levitation, such as when the interactive object moves side to side or up and down within the cradle, such physical contact does not physically support the interactive object. Moreover, in some implementations, the levitation or levitation-like movement of the interactive object can be used to communicate various information to a user. For example, in some implementations, a cradle (also referred to as a charging cradle) can receive an external command to instantiate the levitation or levitation-like movement. For example, a user's personal device (e.g., smartphone) can send a command to the wireless circuitry of the cradle, and in response, the cradle can cause the interactive object (e.g., toy wand) to levitate.

In some implementations, the interactive object (e.g., toy wand) can include a battery and/or associated charging circuitry. For example, a toy wand and a cradle can be configured to charge the battery by, for example, providing electrical current through one or more electrical charging contacts, wireless charging using dedicated wireless charging circuitry, and/or wireless charging using the solenoid coil of the cradle.

In some implementations, the cradle can be configured to control the solenoid coil so as to forcibly retain the interactive object (e.g., toy wand) within the opening at a first position during battery charging, and can further be configured to control the solenoid coil so as to release the interactive object when charging is complete. For example, upon completion of charging, the solenoid coil can release the toy wand, thereby causing the toy wand to levitate at one or more second positions.

As an example, in some implementations, the cradle can be configured to impart one or more magnetic forces such that the interactive object (e.g., toy wand) can be attracted or opposed to cause the interactive object to move between various levitating positions. For example, a first magnetic force can be used to attract a toy wand, thereby causing the toy wand to be forcibly retained (e.g., in a first levitating position for charging), and a second magnetic force can be used to oppose the toy wand, thereby causing the toy wand to be released (e.g., in a second levitating position in which the toy wand levitates within the cradle). The controller of the cradle can be configured to control the timing and amount of electrical current flowing through the solenoid coil by controlling a current waveform (e.g., square wave, sinewave, triangular wave, etc.), a frequency of the current waveform, a duty cycle of the current waveform, a direction of the electrical current, and/or an amplitude of the electrical current.

In some implementations, the magnetically-reactive element in the interactive object (e.g., toy wand) can be a permanent magnet, an electromagnet, and/or another ferromagnetic element. In some implementations, the cradle can include one or more permanent magnets (e.g., disc magnets) which can create a magnetic field that is modified by the electromagnetic field induced by the solenoid coil. For example, the magnetic reaction between a magnet in a toy wand and a permanent magnet in a cradle can cause the toy wand to levitate at a first position, while varying the electrical current in the solenoid coil of the charging wand can cause the toy wand to levitate more closely to the cradle (e.g., at a second levitating position) or further away from the cradle (e.g., at a third levitating position). In this way, the toy wand can be caused to levitate at various positions, thereby allowing for charging to be more efficiently performed by more closely aligning charging elements. Further, the various levitating positions and/or levitation or levitation-like motion sequences can be used to provide various notifications (e.g., communicate information) to a user. In some example embodiments, the wand can be held in a non-levitating position for charging.

For example, in some implementations, when a user places an interactive object (e.g., toy wand) into a cradle, the cradle can determine whether the interactive object needs to be charged. For example, if a toy wand needs charging (e.g., a battery level is less than a threshold, such as full, 100%, etc.), the cradle can position the toy wand in a first position. In some examples, the cradle can cause the toy wand to levitate at a first position, such as a first position for wireless or contact charging. In some implementations, the toy wand can communicate that the toy wand needs charging to the cradle (e.g., via Bluetooth communication). In some implementations, an external command, such as from a user's connected smartphone, can indicate that the toy wand needs charging. Upon completion of charging, the cradle can cause the toy wand to levitate to one or more second positions (e.g., a position indicating the toy wand is charged).

In some implementations, the cradle can further cause the interactive object (e.g., toy wand) to levitate at one or more third positions. For example, the cradle can receive (e.g., obtain) data indicative of an event, such as an interactive opportunity for a user. Further, the cradle can determine a levitation or levitation-like motion sequence based at least in part on the data indicative of the event.

For example, on particular days of the year and/or upon receipt of a notification of a global event from a remote computing system, the cradle can cause a toy wand to levitate in a particular way. For example, a remote computing system may send a notification of a global event (e.g., a special event in a magical world) to a plurality of user devices. The cradle can cause the toy wand to levitate in a particular way (e.g., bounce, bounce vigorously, bounce softly, move up and down slowly, slowly rise and then quickly drop or vice-versa, bounce according to a particular pattern, etc.) which can indicate to a user that the global event is occurring. Further, this notification can provide a user with an opportunity to engage in the global event by, for example, performing certain tasks (e.g., using the toy wand to interact with the user's environment).

Similarly, in some implementations, the cradle can receive a notification that a second user device (e.g., a second toy wand, the user's smartphone, etc.) is nearby. In response, the controller can cause the toy wand to levitate, thereby notifying the user of the presence of the second user device. In some examples, the controller can cause the toy wand to levitate using different levitation movements based on the type or classification of the second user device, based on an identification of the user and/or the user's status, state, etc. In some implementations, the cradle can determine that a certain time threshold has elapsed, and thus cause the toy wand to levitate in a particular way. For example, as the time since a user last removed the toy wand from the cradle increases, the toy wand can levitate more vigorously (e.g., by bouncing faster/higher).

Similarly, when the cradle determines that the toy wand requires charging, during charging, and/or upon completion of charging, the cradle can cause the toy wand to levitate in one or more particular ways. For example, should the user attempt to remove the toy wand from the cradle before the toy wand has been fully charged, the cradle can cause the toy wand to oppose removal of the toy wand (e.g., by varying the electromagnetic field and/or increasing an attractive magnetic reaction with the toy wand), thereby indicating to a user that the wand is still charging. In some examples, the cradle and/or the toy wand can detect that the wand is being removed and provide an alert indicating that the wand is being charged.

The present disclosure provides a number of technical effects and benefits. For example, the disclosed technology can allow for an interactive object/user device, such as a toy wand, to levitate in response to various events and in various ways. For example, a cradle can control an electromagnetic reaction with the toy wand to forcibly retain the toy wand while charging. This can improve the efficiency of charging by aligning respective charging elements (e.g., wireless charging elements, electrical contacts, etc.) of the toy wand and cradle to improve power transfer. Further, the cradle can cause the toy wand to be levitate when charging is complete, thereby providing a quick visual notification to a user that the toy wand is ready for use.

The systems and methods of the present disclosure further provide for nonverbal communication of information to a user by causing an interactive object to levitate in various ways. For example, in response to one or more events, a cradle can cause a toy wand to levitate according to a levitation or levitation-like motion sequence. Each levitation or levitation-like motion sequence can be configured to indicate particular information associated with the event (e.g., that another user is nearby, that a global event is occurring, that a time period has elapsed, that charging is needed/ongoing/complete, etc.).

The systems and methods of the present disclosure can further provide an immersive user experience. For example, by "magically" levitating a toy wand in a particular way, the user can be informed of interactive opportunities within the user's environment. In response, the user can choose to engage in the various interactive opportunities.

FIGS. 1A-E depict an example interactive object and an example hardware architecture of an interactive object according to example aspects of the present disclosure. For example, FIG. 1A depicts an example interactive object 100. The interactive object 100 can be a hand-held electronic device. The interactive object 100 can be an interactive toy (e.g., an electronic smart toy wand, etc.). For instance, the interactive object 100 can include a wand-like form factor. The wand-like form factor can include a generally cylindrical shape. In some implementations, the wand-like form factor of the interactive object 100 can include one or more other shapes (e.g., square, rectangular, hexagonal, octagonal, etc.). In some implementations, the interactive object 100 may include another type of form-factor such as, for example, a spherical form-factor. An interactive object can include any device having one or more processors and at least one sensor. For example, an interactive object may include a tablet computing device, smartphone, portable media player, etc. The interactive object 100 (and its portions/elements) can be constructed from one or more materials including, for example, polymers, metal, wood, composites, and/or one or more other materials.

The interactive object 100 can include a plurality of portions. For example, the interactive object 100 can include a first end/portion 105 and a second end/portion 110. The first end/portion 105 can include, for example, a tip 115 (e.g., of the wand, etc.) and a shaft portion 116. The second end/portion 110 can include a handle 120 (e.g., a wand handle, etc.). In some implementations, the handle 120 can include a material suitable for securing or comforting the grip of a user (e.g., rubber, polymer, ridged surface, padding, etc.).

Figure 1B:
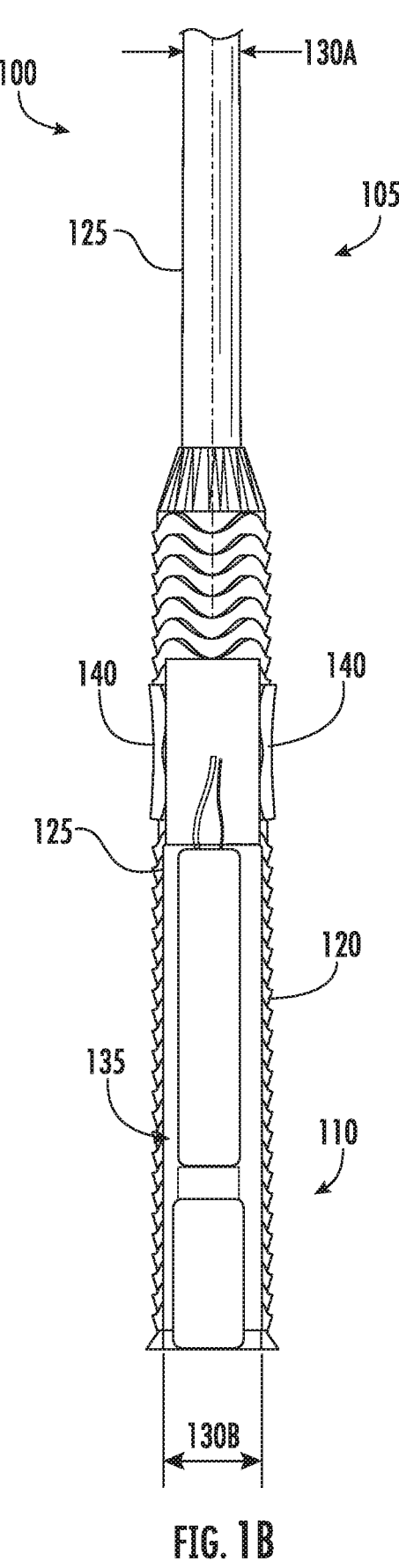

With reference to FIG. 1B, the interactive object 100 can include an outer casing 125 (e.g., an outer shell, layer, etc.) with an outer surface. In some implementations, at least a portion of the outer casing 125 can be covered by another material. This can include, for example, a grip/comfort material of the handle 120. The outer casing 125 can include one or more diameters/widths 130A-B. For example, the first end/portion 105 can be associated with one or more first diameters 130A (e.g., 15 mm, etc.). The second end/portion 110 can be associated with one or more second diameters 130B. The first diameter(s) 130A can be smaller than the second diameter(s) 130B. This can allow, for example, the interactive object 100 to appear tapered from the second end 110 to the first end 105.

In some implementations, the interactive object 100 can include one or more devices for obtaining user input. For instance, the interactive object 100 can include a user input sensor 135 on the interactive object. The user input sensor 135 can be disposed proximate to the second end 110 (e.g., closer to the second end 110 than the first end 105, etc.). For example, the user input sensor 135 can be disposed within a cavity formed by the outer casing 125 and within/under the handle 120. The user input sensor 135 can include an inductive sensor. The inductive sensor can include a coil with a metal casing surrounding the coil. The coil can be configured to detect a change in a magnetic field arising from a deformation of the metal casing. Such a deformation can be caused, for example, by a user input (e.g., a user physically gripping the handle 120 of the interactive object 100, etc.). Additionally, or alternatively, the interactive object 100 can include one or more interactive elements 140. This can include, for example, one or more buttons, touchpads, and/or other features that a user can physically contact to provide user input.

Figure 1C:
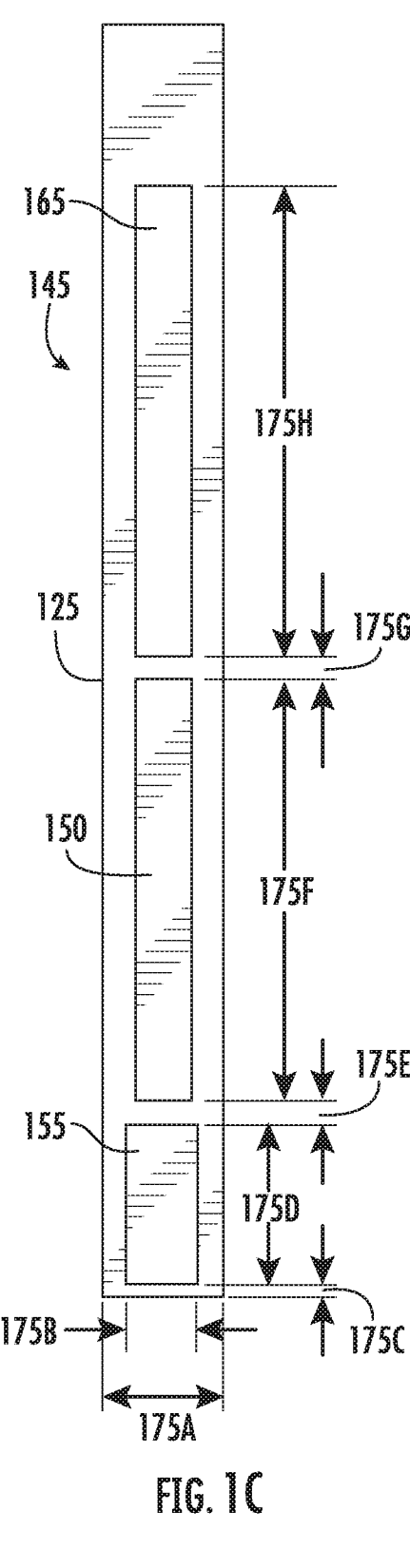
Figure 1D:
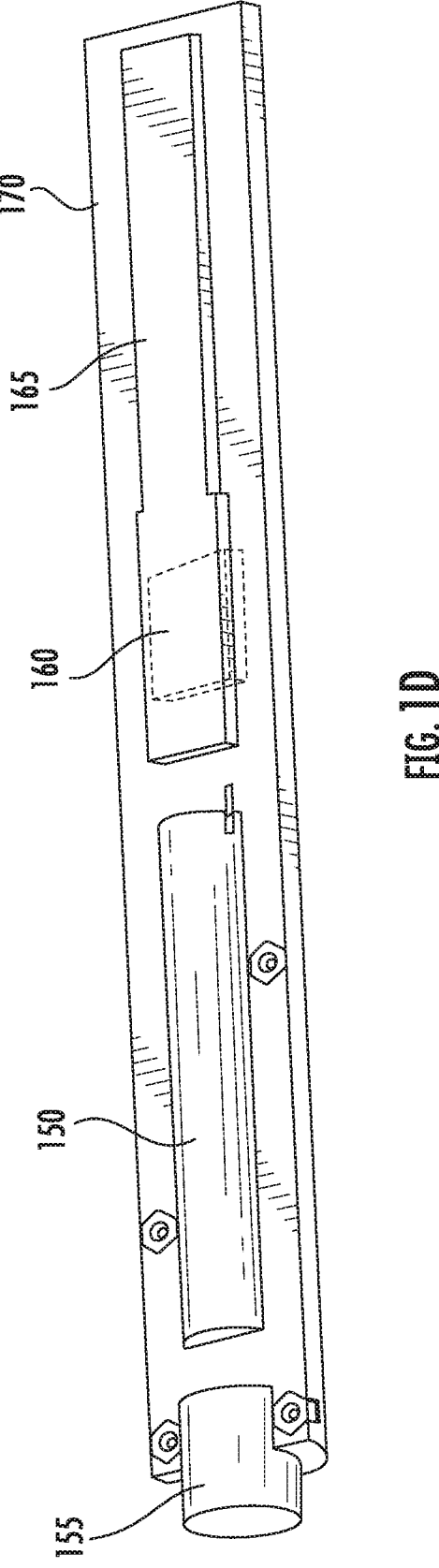

With reference to FIGS. 1C and 1D, the interactive object 100 can include a cavity 145. As described herein, the cavity 145 can be an interior cavity of the interactive object 100 formed by the outer casing 125. Various hardware components for performing the functions of the interactive object 100 can be disposed within the cavity 145. The interactive object 100 can include a power source 150 with an associated charging/fueling infrastructure 155. For example, the power source 150 can include one or more batteries (e.g., lithium-ion batteries, lithium-ion polymer batteries, and/or other batteries) and the charging/fueling infrastructure 155 can include wired and/or wireless (e.g., inductive, etc.) charging hardware. In some implementations, the interactive object 100 can include a haptic actuator 160 (shown in FIG. 1D) and a printed circuit board 165. The haptic actuator 160 can be configured to provide haptic feedback (e.g., vibration, etc.) to a user of the interactive object 100. As shown in FIG. 1D, various hardware components can be secured to/within the interactive object 100 via a support structure 170. The support structure 170 can include a mechanical spine or other structural element to which the various hardware components can be affixed. The support structure 170 can be affixed to the outer casing 125 (e.g., an interior surface thereof, etc.). In some implementations, the support structure 170 can be temporarily affixed so that it can be removed for maintenance, replacement, update, etc. of the various hardware components.

As shown in FIG. 1C, the cavity 145 and the various hardware components can include various dimensions 175A-H. For example, the cavity 145 can include a width with a first dimension 175A (e.g., 2-25 mm, etc.). This can represent the distance from one side of the interior surface of the outer casing 125 to another. The charging/fueling infrastructure 155 can include a width with a second dimension 175B (e.g., 3-15 mm, etc.), can be spaced from an end of the cavity 145 by a third dimension 175C (e.g., 0.5-3 mm, etc.), and can have a length of a fourth dimension 175D (e.g., 10-30 mm, etc.). The power source 150 can be spaced apart from the charging/fueling infrastructure by a fifth dimension 175E (e.g., 0.5-7 mm, etc.) and have a length of a sixth dimension 175F (e.g., 30-70 mm, etc.). The support structure 165 can be spaced apart from the power source 150 by a sixth dimension 175G (e.g., 0.5-7 mm, etc.) and have a length of a seventh dimension 175H (e.g., 30-70 mm, etc.).

Figure 1E:
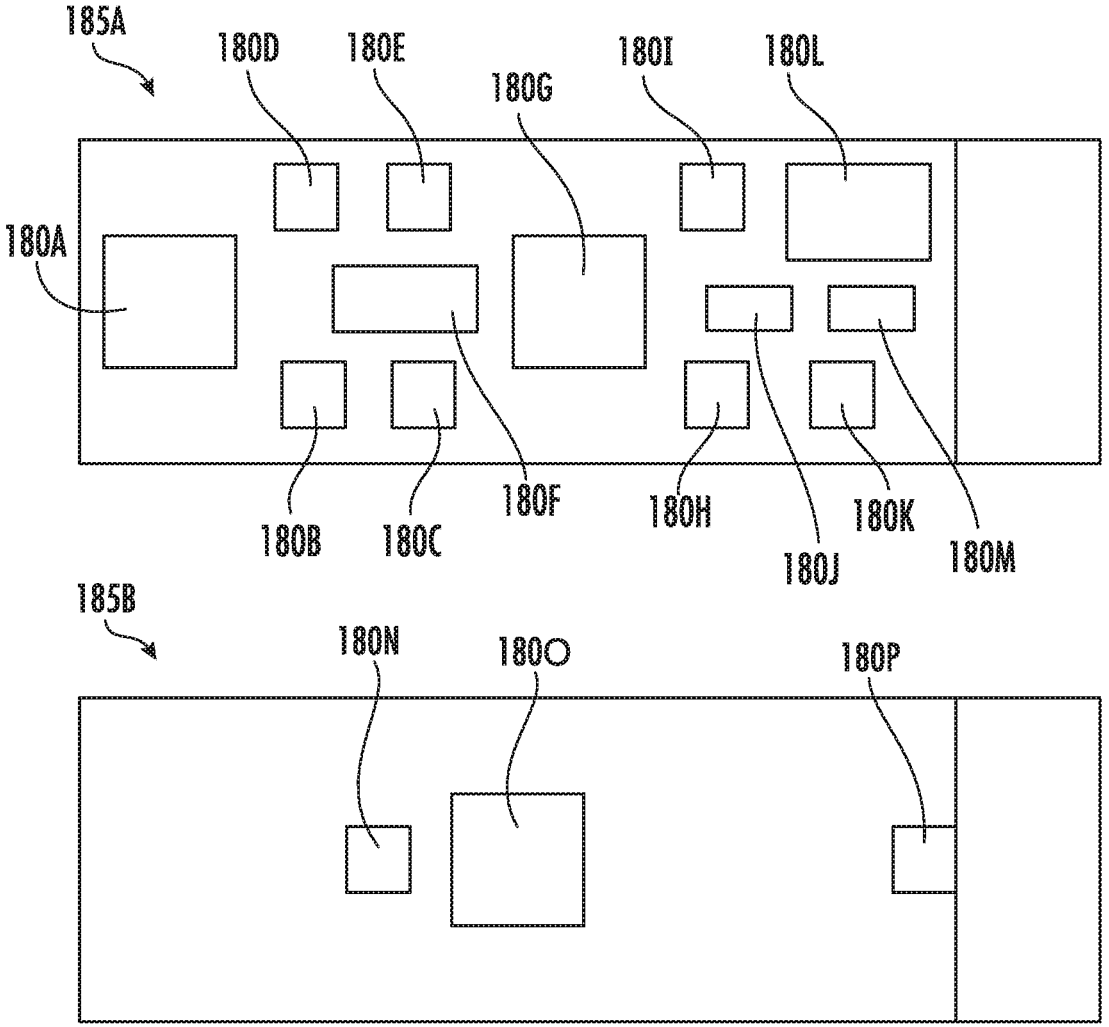

FIG. 1E depicts another diagram of example hardware components 180A-P that can be included in the interactive object 100. The hardware components 180A-P can be disposed across various layers 185A-B (e.g., top layer, bottom layer, etc.). As an example, the interactive object 100 can include one or more infrared sensors 180M. The infrared sensors can include one or more infrared receivers, transmitters, etc. that enable the interactive object 100 to transmit and/or receive one or more infrared signals. In addition, the hardware component(s) 180A-P can include, for example: charging/fueling infrastructure 180A (e.g., as described herein, etc.); device(s) 180B/K for detecting user input (e.g., inductive sensor, button(s), etc.); one or more output device(s) 180C (e.g., LED/other lights, speakers, etc.) and associated hardware 180P (e.g., connector(s), etc.); a gauge 180D configured to indicate a level of power of the interactive device 100; (e.g., a battery for wired or wireless charging, etc.); power management integrated circuit(s) 180E configured to manage the power of the interactive device 100; a power source 180F (e.g., as described herein, etc.); microcontroller(s) 180G; an inertial measurement unit 180H (e.g., accelerometer, gyroscope, etc.); haptic actuator 180I (e.g., eccentric rotating mass (ERM) motor, etc.) and associated actuator hardware 180N (e.g., connector(s), etc.); memory 180J (e.g., non-volatile memory chip, flash memory, etc.); a communication interface 180K (e.g., antenna, etc.) and associated computing hardware 180L (e.g., BLE chip, etc.); processor(s) 180O; and/or other components. In some implementations, the output device(s) 180C can be configured to output signals from the first end 105 (e.g., the tip 115, etc.) of the interactive object 100.

The hardware architecture/components can allow the interactive object 100 to communicate with and be received within a cradle (e.g., a charging cradle).

Figure 2:
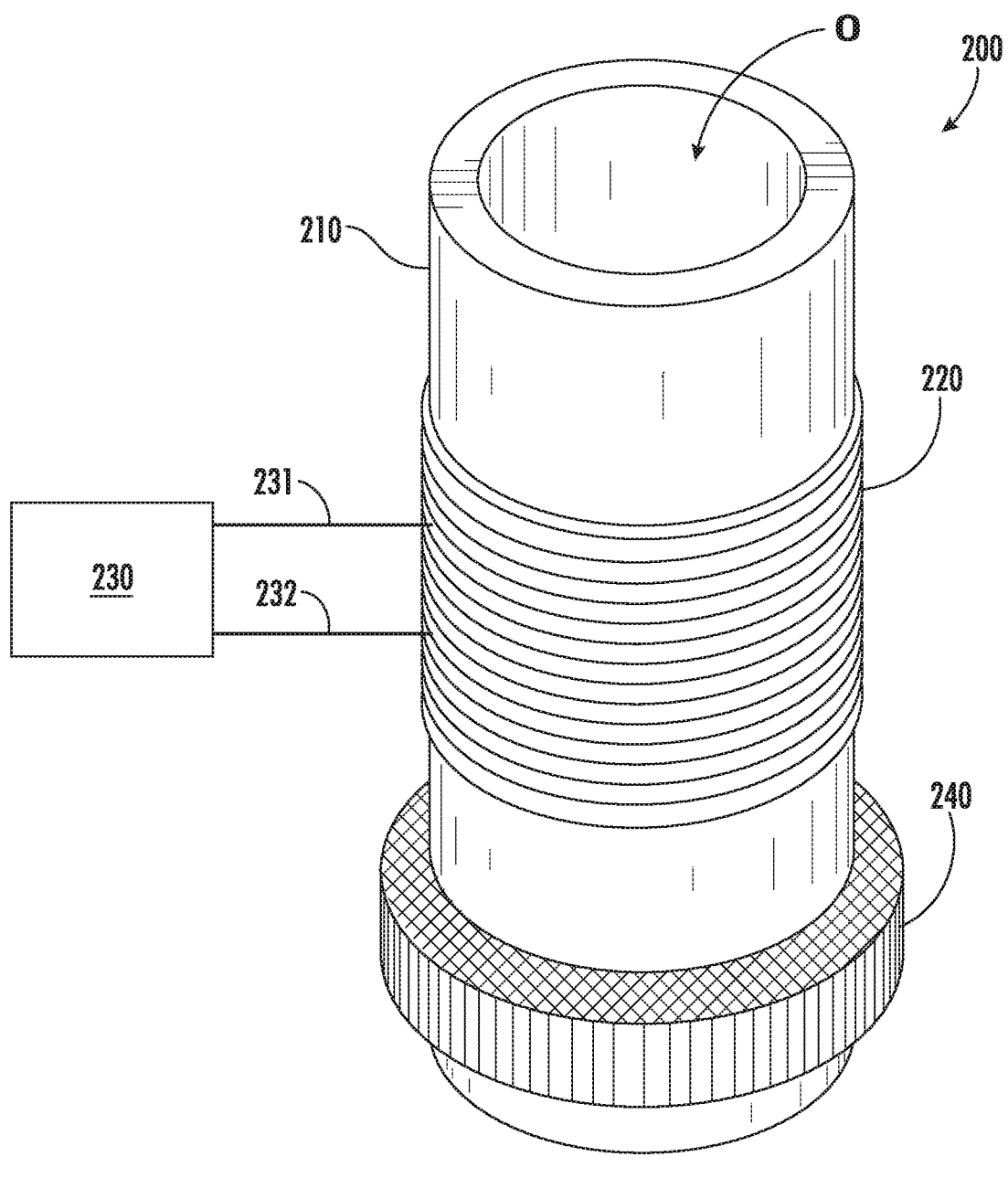
FIG. 2 depicts an example cradle according to example aspects of the present disclosure.

FIG. 2 depicts an example cradle 200 according to example aspects of the present disclosure. The cradle 200 can be configured to receive and hold an interactive object, such as an interactive object 100 depicted in FIGS. 1A-E.

For example, as depicted, the cradle 200 can include a body 210 that is shaped to form an opening therethrough sufficient to accommodate the shaft portion of an interactive object 100. For example, as depicted, the body 210 of the cradle 200 has a generally cylindrical shape with an opening O extending the length of the body 210. Stated differently, the body 210 of the cradle 200 can be configured in a tube shape. While the body 210 of the cradle 200 is depicted as having a generally cylindrical shape, other suitable shapes can similarly be used in a body 210 (e.g., square, rectangular, hexagonal, octagonal, etc.). The cradle 200 (and its portions/elements) can be constructed from one or more materials including, for example, polymers, metal, wood, composites, and/or one or more other materials.

The cradle 200 can further include a solenoid coil proximate the opening O of the body 210. For example, in some implementations, the solenoid coil can be formed around the opening O. The solenoid coil 220 can be formed out of an electrically conductive material, such as, for example, various metals (e.g., copper and/or aluminum wire). The cradle 200 can further include electrical circuitry 234 causing an electrical current to flow in the solenoid coil 220. For example, a first lead 231 and a second lead 232 can be coupled to the solenoid coil 220.

In some implementations, the cradle 200 can include one or more permanent magnets 240. For example, as depicted, a disc magnet 240 is disposed around the body 210. Other types of magnets 240 can also similarly be used (e.g., bar magnets, electromagnets, etc.)

The electrical circuitry 230 can be configured to cause an electrical current to flow in the solenoid coil that causes levitation or levitation-like movement of an interactive object (e.g., a toy wand) within the opening O by virtue of electromagnetic interaction with a magnetically reactive element of a shaft portion of the interactive object. In implementations in which one or more magnets 240 are included in a cradle 200, the electromagnetic field induced by the flow of the electrical current in the solenoid 220 can interact with the one or more magnets 240 to cause the levitation or levitation-like movement of the interactive object. While the electrical circuitry 230 is depicted as being coupled to the body 210 (e.g., via the leads 231/232), in various implementations, the electrical circuitry 230 can be incorporated into or otherwise a part of the body 210.

Figure 3:
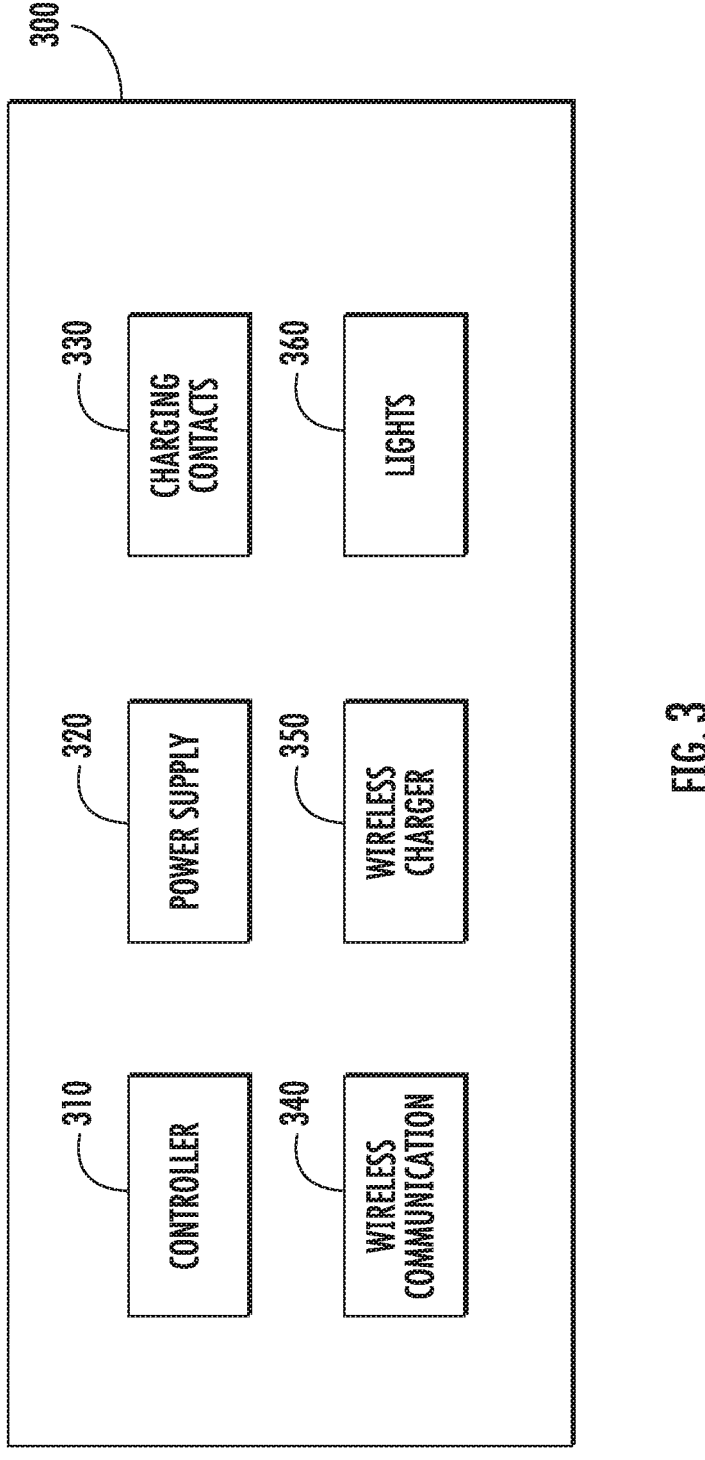
FIG. 3 depicts an example cradle electrical circuitry configuration according to example aspects of the present disclosure.

For example, referring now to FIG. 3, an example block diagram of electrical circuitry components 300 that can be included in a cradle 200 is depicted. The electrical circuitry components 300 can correspond to, for example, the electrical circuitry 230 depicted in FIG. 2.

As shown, the electrical circuitry components 300 can include a controller 310. For example, the controller 310 can include one or more processors (e.g., processor cores, microprocessors, ASICs, FPGAs, etc.) and one or more memory devices (e.g., non-transitory, computer-readable storage media, such as RAM, ROM, EEPROM, EPROM, flash memory devices, magnetic disks, etc.). In various implementations, the controller 310 can be configured to control the flow of an electrical current, such as an electrical current to a solenoid coil of a cradle. For example, the controller 310 can be configured to control a waveform of an electrical current (e.g., square wave, sinewave, triangle wave, etc.) a frequency (Hz) of an electrical current, a duty cycle of an electrical current, a direction of a current, and amplitude of a current, and/or other electrical current properties.

The electrical circuitry components 300 can include a power supply 320. In various implementations, the power supply 320 can include various AC (e.g., 60 hz 120V) and/or DC (e.g., 12V DC) power sources, converters (AC to DC, DC to AC), etc. In some implementations, the power supply 320 can include one or more energy storage devices (e.g., batteries, capacitors, etc.).

The electrical circuitry components 300 can include one or more charging contacts 330. For example, the charging contacts 330 can correspond to charging contacts on an associated interactive object (e.g., toy wand) such that when the charging contacts 330 contact the corresponding charging contacts of the interactive object, electrical power can be provided to the interactive object, such as to charge one or more batteries of the interactive object.

The electrical circuitry components 300 can include wireless communication circuitry 340. For example, in various implementations, the wireless communication circuitry 340 can include communication circuitry configured for a local area network (e.g. intranet), wide area network (e.g. Internet), cellular network, Bluetooth and/or Bluetooth Low Energy network, infrared communication, radio communication, or some combination thereof and can include any number of wired and/or wireless links. The wireless communication circuitry 340 can further include various transmitters, receivers, ports, controllers, antennas, chips, or other suitable components.

In some implementations, the wireless communication circuitry 340 can receive one or more external commands, such as a command to instantiate levitation or levitation-like movement. In some implementations, the wireless communication circuitry 340 can receive one or more external commands to initiate charging. In some implementations, the wireless communication circuitry 340 can receive communications from one or more remote devices, such as a remote computing system, a user's computing device (e.g., smart phone), and other interactive object (e.g., another user's toy wand), and/or other devices.

The electrical circuitry components 300 can include wireless charging circuitry 350 configured to provide wireless charging. For example, in some implementations, the wireless charging circuitry 350 can include dedicated circuitry configured to provide inductive charging to an interactive object positioned within the cradle. In some implementations, the wireless charging circuitry 350 can include the solenoid coil of the cradle.

In some implementations, the electrical circuitry components 300 can include lights 360. For example, in some implementations, the lights 360 can include LEDs positioned in a body of a cradle.

The electrical circuitry components 300 can further include other electrical circuitry components, such as audio playback devices (e.g. speakers, etc.), microphones, display screens, user interfaces, and/or other electrical circuitry components 300.

Figure 4:
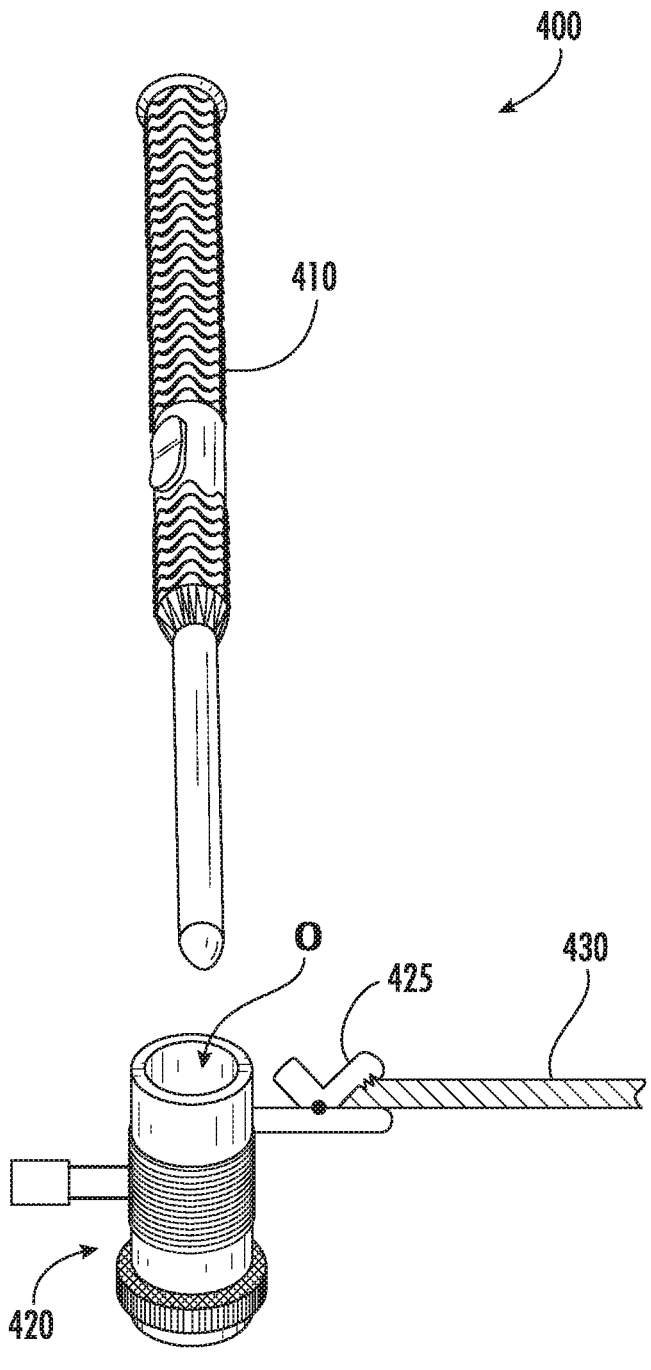
FIG. 4 depicts an example interactive object and cradle configuration according to example aspects of the present disclosure.

Referring now to FIG. 4, an example interactive object 410 (e.g., toy wand) and associated cradle 420 are depicted. The interactive object 410 and cradle 420 can correspond to, for example, the interactive objects and/or cradles depicted in FIGS. 1-3. For example, as shown, an opening O of the cradle 420 can be configured to receive at least a portion of the interactive object 410, such as a shaft of a toy wand.

Further, as depicted, in some implementations, the cradle 420 can include an attachment device 425. The attachment device can be, for example, one or more mechanical fasteners (e.g., clips, clamps, vices, etc.) configured to attach the cradle to a surface 430. The attachment device 425 can allow the cradle to be positioned such that the shaft (or other portion) of the interactive object 410 can extend through the opening O. Further, this can allow various levitating positions to be achieved.

Figure 5:
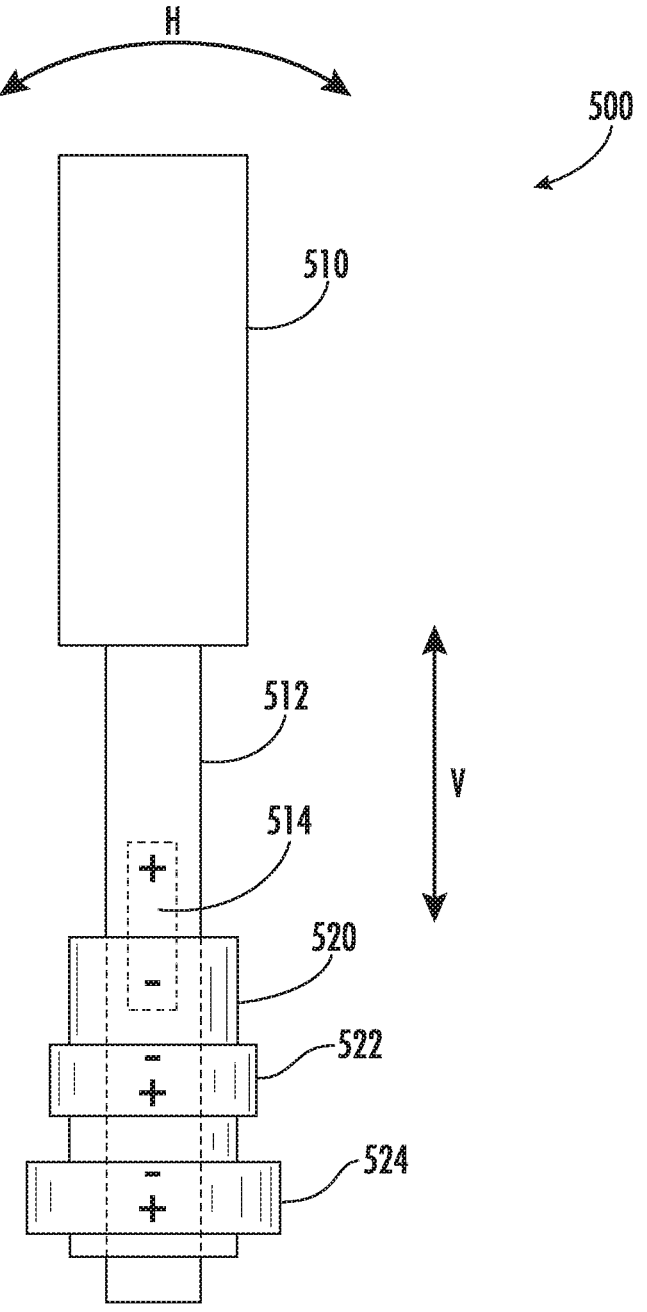
FIG. 5 depicts an example interactive object and cradle configuration according to example aspects of the present disclosure.

For example, referring now to FIG. 5, an example interactive object 510 (e.g., toy wand) and associated cradle 520 are depicted. The interactive object 510 and cradle 520 can correspond to, for example, the interactive objects and/or cradles depicted in FIGS. 1-4. As shown, the interactive object 510 can include a shaft portion 512. The cradle 520 can have an opening into which the shaft 512 of the interactive object 510 can be placed. For example, as shown, the shaft 512 of the interactive object 510 can extend through the entirety of the opening of the cradle 520.

The interactive object 510 can include a magnetically-reactive element 514 inside the shaft portion 512. For example, in some implementations, the magnetically-reactive element can include a permanent magnet, an electromagnet, and/or other ferromagnetic materials. As depicted, the magnetically-reactive element 514 can have two opposing poles which produce a magnetic field. For example, one side of the magnetically-reactive element 514 can have a positive pole (depicted with +) and an opposite side can have a negative pole (depicted with −). The magnetically-reactive element 514 can produce a magnetic field, which can interact with a magnetic field produced by the cradle 520. In some implementations, the magnetically-reactive element 514 can be an electromagnet.

For example, as shown, in some implementations, the cradle 520 can include a solenoid 522 and/or one or more permanent magnets 524. For example, the one or more permanent magnets 524 can include one or more bar magnets, disc magnets, and/or other permanent magnets. Similar to the magnetically-reactive element 514, the one or more permanent magnets 524 can have two opposing poles which produce a magnetic field. For example, one side of the permanent magnet(s) 524 can have a positive pole (depicted with +) and an opposite side can have a negative pole (depicted with −).

The solenoid 522 can be configured to induce an electromagnetic field via a controller, as described herein. For example, by changing a direction the flow of an electrical current, the electromagnetic field induced by the solenoid 522 can be controlled such that the polarity of the magnetic field can change (e.g., from + to − and vice-versa).

As depicted, the cradle 520 can receive the interactive object 510 in the opening of the cradle 520. Further, in some implementations, the polarity of the magnetically-reactive element 514 and the polarity of the solenoid 522 and/or the one or more permanent magnets 524 can oppose one another when the interactive object 510 is placed into the cradle 520. For example, the strength and polarity of the one or more permanent magnets 524 can be generally fixed, and the strength and polarity of the solenoid 522 can be controlled to add to or subtract from the magnetic field of the one or more permanent magnets 524. The combined magnetic field induced by the cradle 520 (via the solenoid 522 and/or the permanent magnet(s) 524) can oppose the magnetic field induced by the magnetically-reactive element 514 such that the interactive object 510 can levitate within the cradle 520. For example, as depicted, the interactive object 510 can generally move along a vertical direction V (e.g., "up" and "down" within the cradle 520) and, in some implementations, the gap between the shaft 512 and the inside of the opening of the cradle 520 can allow for movement along a horizontal direction H (e.g., side to side). As an example, in implementations in which the shaft 512 is tapered from the tip to the handle, as the interactive object 510 moves up the vertical direction V, the gap between the shaft 512 and the opening of the cradle 520 will increase, allowing for increased freedom of movement in the direction H (e.g., wobbling side to side).

In some implementations, the strength of the magnetic field induced by the permanent magnet 524 can be sufficiently strong to oppose the magnetic field induced by the magnetically-reactive element 514 such that when the interactive object 510 is placed within the cradle 520, the interactive object 510 can levitate within the cradle. As an example, the opposing magnetic forces can cause an equilibrium to be achieved such that the interactive object 510 can levitate within the cradle 520.

Figure 6:
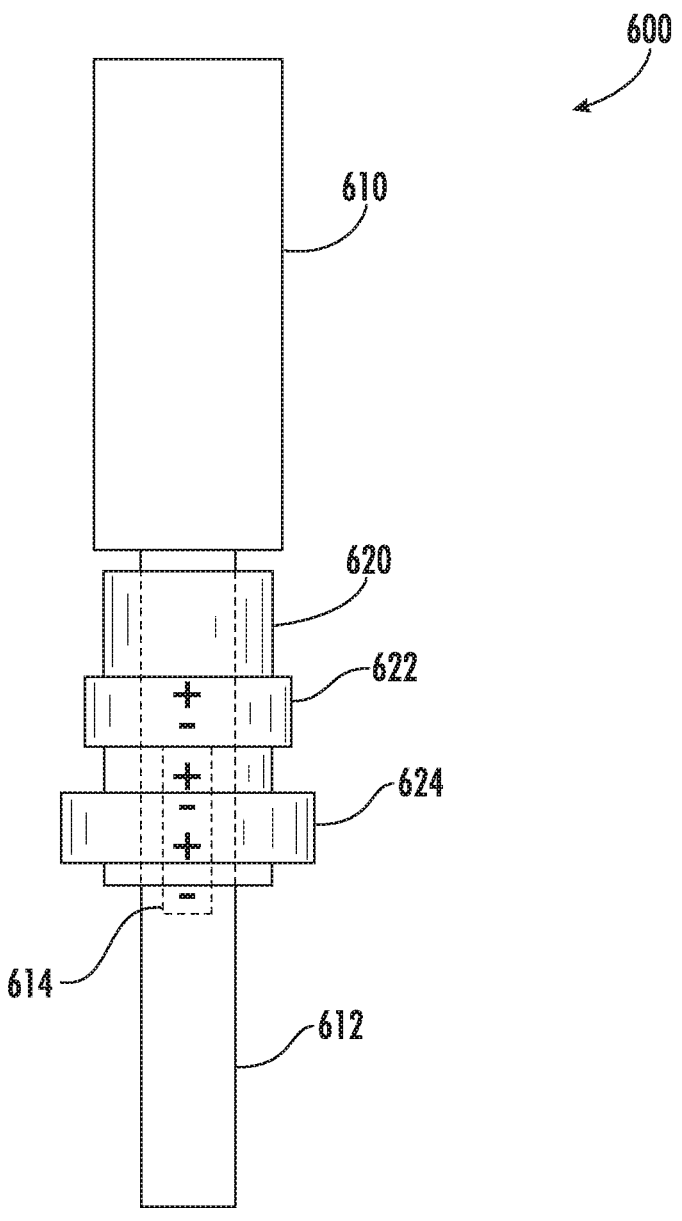
FIG. 6 depicts an example interactive object and cradle configuration according to example aspects of the present disclosure.

Referring now to FIG. 6, another example interactive object 610 and cradle 620 are depicted. The interactive object 610 and cradle 620 can correspond to, for example, the interactive objects and/or cradles depicted in FIGS. 1-5. For example, the interactive object 610 can include a shaft 612 with a magnetically-reactive element 614 inside the shaft 612, as described herein. Further, the cradle 620 can include a solenoid 622 and/or one or more permanent magnets 624, as described herein.

As depicted in FIG. 6, the interactive object 610 is in a different position than the interactive object 510 depicted in FIG. 5. For example, as shown, the interactive object 610 in FIG. 6 has been moved further within the cradle 620 such that the shaft 612 extends well through the opening of the cradle 620. For ease of reference, the position of the interactive object 510 in the cradle 520 depicted in FIG. 5 will be referred to as a "first" position, whereas the position of the interactive object 610 in the cradle 620 depicted in FIG. 6 will be referred to as a "second" position. However, such terms are not meant to be limiting, and can be interchangeable.

As shown, in FIG. 6, when in the second position, the polarity of the magnetically-reactive element 614 will cause an attractive force when interacting with the polarity of the one or more permanent magnets 624 and/or the solenoid 622. For example, the respective positive and negative poles of the magnetically-reactive element 614, the solenoid 622, and/or the one or more permanent magnets 624 can be aligned such that the interactive object 610 can be forcibly retained within the cradle 620. For example, when the force exerted on the interactive object 610 is sufficient to overcome the opposing magnetic force when in the first position, the interactive object can move from the first position to the second position. Once in the second position, the interactive object 610 can be forcibly retained due to the attractive magnetic force reactions between the magnetically-reactive element 614 and the solenoid 622 and/or permanent magnet(s) 624.

In some implementations, the solenoid 622 can be controlled to cause the interactive object 610 to move from the first position to the second position. For example, by varying the amplitude and direction of the electrical current provided to the solenoid 622, the electromagnetic field induced by the solenoid 622 can be controlled to move the interactive object 610 from the first position to the second position. As an example, the solenoid 622 can be controlled to induce an attractive electromagnetic field sufficient to cause the interactive object 610 to move within the cradle until the magnetically-reactive element 614 has moved at least partially past the solenoid 622, at which time the solenoid 622 can be controlled to induce an opposing electromagnetic field sufficient to cause the interactive object 610 to continue moving until the interactive object 610 reaches the second position. In some implementations, once the interactive object 610 is in the second position, the solenoid 622 can cease inducing an electromagnetic field, and the attractive forces generated by the permanent magnet(s) 624 can forcibly retain the interactive object 610. In some implementations in which the magnetically-reactive element 614 is an electromagnet, the solenoid 622 and the magnetically-reactive element 614 can cooperate to cause the interactive object 610 to move between positions. For example, a strength and/or direction of a magnetic field induced by the magnetically-reactive element 614 can be altered to assist in moving the interactive object 610 between positions.

In some implementations, once the interactive object 610 is in the second position, the cradle 620 can charge the interactive object 610. For example, in some implementations, when the interactive object 610 is in the second position, the solenoid 622 can be controlled to inductively charge corresponding charging circuitry of the interactive object 610, as described herein. Similarly, in some implementations, electrical contacts of the cradle 620 and corresponding electrical contacts of the interactive object 610 (not shown) can be aligned to allow for contact charging of the interactive object 610. Further, in some implementations, a dedicated wireless charger of the cradle 620, such as a separate inductive and/or capacitive charger, can be aligned with corresponding charging circuitry of the interactive object 610 when the interactive object 610 is in the second position, thereby allowing for charging to occur.

In some implementations, the second position can be a levitating position. For example, the attractive magnetic forces between the magnetically-reactive element 614 and the magnetic field induced by the cradle 620 (e.g., via the solenoid 622 and/or one or more permanent magnets 624) can cause the interactive object 610 to levitate at the second position within the cradle 620.

In some implementations, upon completion of charging or upon the occurrence of some other event as described herein, the cradle 620 can control the solenoid 622 to cause the interactive object to move between the first and second positions. For example, upon receipt of an external command to instantiate charging, the solenoid 622 can be controlled to cause the interactive object 610 to move from the first position to the second position. Upon completion of charging, the solenoid 622 can be configured to control the interactive object 610 from the second position back to the first position. For example, once charging is complete, the solenoid 622 can be controlled to induce a magnetic field to move the interactive object 610 back to the first position.

Figure 7:
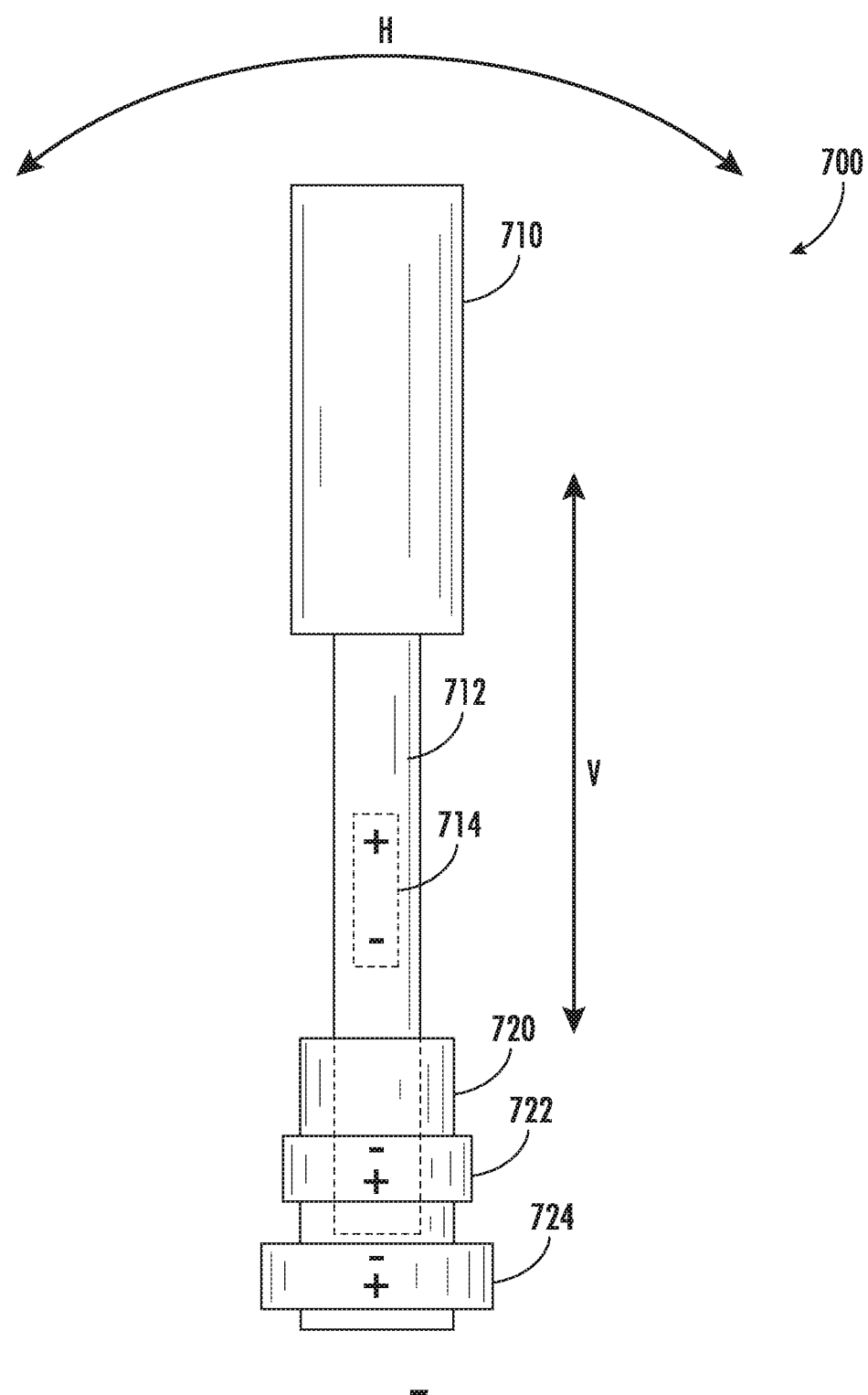
FIG. 7 depicts an example interactive object and cradle configuration according to example aspects of the present disclosure.

Referring now to FIG. 7, another example interactive object 710 and cradle 720 are depicted. The interactive object 710 and cradle 720 can correspond to, for example, the interactive objects and/or cradles depicted in FIGS. 1-6. For example, the interactive object 710 can include a shaft 712 with a magnetically-reactive element 714 inside the shaft 712, as described herein. Further, the cradle 720 can include a solenoid 722 and/or one or more permanent magnets 724, as described herein.

As depicted in FIG. 7, the interactive object 710 is in a different position than the interactive objects 510/610 depicted in FIGS. 5 and 6. For example, as shown, the interactive object 710 in FIG. 7 has been moved to extend further out of the cradle 720 such that only a small portion of the shaft 712 extends into the opening of the cradle 720. For ease of reference, the position of the interactive object 710 in the cradle 720 depicted in FIG. 7 will be referred to as a "third" position, differing from the "first" and "second" positions depicted in FIGS. 5 and 6. However, such terms are not meant to be limiting, and can be interchangeable.

As shown, in the third position, the interactive object 710 can levitate within the cradle 720. For example, the interactive object 710 can move along the vertical direction V and/or the horizontal direction H within the cradle 720. The levitation of the interactive object 710 can be controlled by controlling the amount of electrical current flowing in the solenoid 722. For example, by increasing an amplitude of the electrical current, the strength of the magnetic field induced by the solenoid 722 can increase to oppose the magnetic field of the magnetically-reactive element 714. In this way, the cradle 720 can cause levitation or levitation-like movement of the interactive object 710.

In some implementations, a controller of the cradle 720 can control the timing and amount of electrical current such as by controlling a current waveform (e.g., square wave, sinewave, triangular wave, etc.), A frequency of the current waveform, a duty cycle of the current waveform, a direction of electrical current, and/or an amplitude of the electrical current. For example, the cradle 720 (e.g., via the solenoid and/or controller) can cause the interactive object 710 to move according to a particular levitation or levitation-like motion sequence. The levitation or levitation-like motion sequence can be, for example, configured to notify a user of an event.

As an example, upon completion of charging, the cradle 720 can cause the interactive object 710 to move from the second position to the first position. Further, the cradle 720 can cause the interactive object to repeatedly move slowly up (along the vertical direction V) to the third position and quickly drop back to the first position. This can alert a user that charging has completed. Other similar levitation and levitation-like motion sequences can be performed, such as those described herein.

Referring now to FIG. 8, an example method 800 according to example aspects of the present disclosure is depicted. One or more portion(s) of method 800 can be implemented by one or more computing device(s) such as, for example, those shown in FIGS. 1-7. Moreover, one or more portion(s) of the method 800 can be implemented as an algorithm on the hardware components of the device(s) described herein (e.g., as in FIGS. 1-7) to, for example, charge an interactive object (e.g., a toy wand). FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At 810, the method 800 can include receiving, into an opening of a charging cradle, a user device. For example, in some implementations, the user device can be an interactive object, such as a toy wand. The charging cradle can include an opening configured to receive at least a portion of the user device, such as a shaft portion of a toy wand. A user can place the user device into the charging cradle. In some implementations, the user device can levitate within the charging cradle upon receipt (e.g., as depicted in FIG. 5).

At 820, the method 800 can include receiving an external command to charge the user device. For example, in some implementations, the external command can be received via wireless communication circuitry (e.g., Bluetooth). The external command can be received, for example, from an associated user device (e.g., a smart phone) and/or the user device itself (e.g., communicated to the charging cradle from a toy wand). In some implementations, the user device can be configured to determine that charging is needed (e.g., a battery charge level is lower than a threshold) and can communicate the external command to the charging cradle.

At 830, the method 800 can include causing a first electrical current to flow to cause a user device to be forcibly retained at a first position. For example, in some implementations, a solenoid of the charging cradle can be controlled by a controller of the charging cradle to induce an electromagnetic field which can interact with a magnetically-reactive element of the user device. The magnetic field interaction can cause the user device to be retained at a first position. In some implementations, the first position can be a first levitating position, such as depicted in FIG. 6.

At 840, the method 800 can include charging the user device using wireless charging. For example, in some implementations, a dedicated wireless charging circuitry (e.g., inductive/capacitive charging) of the charging cradle can wirelessly induce a charging current in a respective wireless charging circuitry of the user device. In some implementations, the wireless charging can be performed by a solenoid of the charging cradle, as described herein.

At 850, the method 800 can include ceasing charging of the user device. For example, upon occurrence of an event, such as receipt of an external command to cease charging, the charging cradle can cease charging. In some implementations, the user device can be configured to communicate the external command to cease charging. In some implementations, an associated user device, such as a user's smart phone can communicate the external command. In some implementations, the charging cradle can cease charging the user device after completing charging the user device to at least a threshold charge level (e.g., greater than a battery percentage threshold).

At 860, the method 800 can include causing an electrical current to flow to cause the user device to levitate within the opening at one or more levitating positions. As an example, in some implementations, a user device/interactive object (e.g., a toy wand) can be moved between various levitating positions, such as the positions depicted in FIGS. 5-7. In some implementations, the charging cradle can cause an electrical current to flow in a solenoid, thereby inducing a magnetic field which moves the user device (e.g., toy wand) from a first position to a second or third position.

Figure 9:
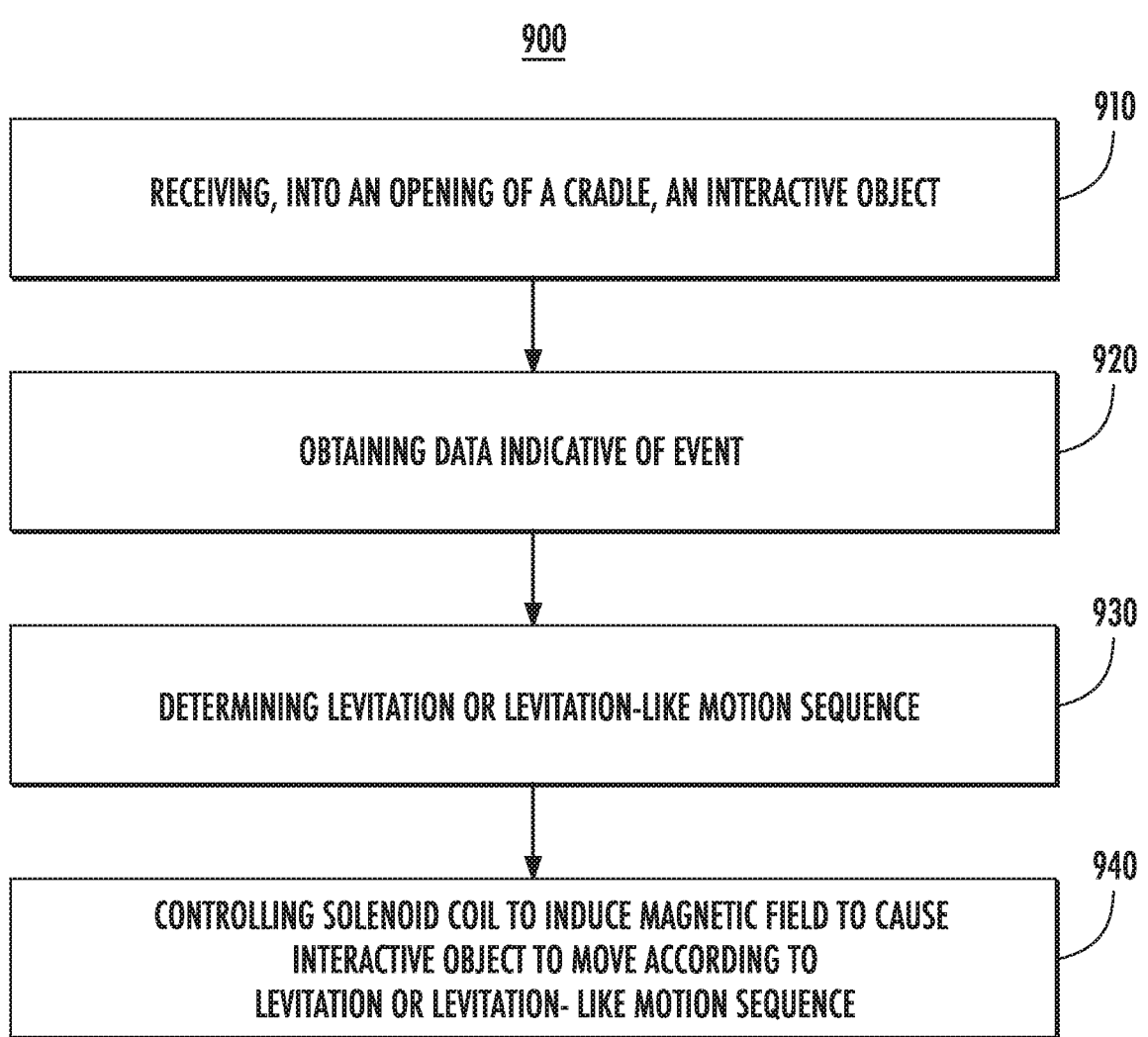
FIG. 9 depicts an example method according to example aspects of the present disclosure.

Referring now to FIG. 9, an example method 900 according to example aspects of the present disclosure is depicted. One or more portion(s) of method 900 can be implemented by one or more computing device(s) such as, for example, those shown in FIGS. 1-7. Moreover, one or more portion(s) of the method 900 can be implemented as an algorithm on the hardware components of the device(s) described herein (e.g., as in FIGS. 1-7) to, for example, charge an interactive object (e.g., a toy wand). FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At 910, the method 900 can include receiving, into an opening of a cradle, an interactive object. For example, in some implementations, the interactive object can be a toy wand. In some implementations, the cradle can include an opening with a solenoid coil proximate (e.g., formed around) the opening. At least a portion of the interactive object (e.g., a shaft portion of a toy wand) can be received into the opening of the cradle.

At 920, the method 900 can include obtaining data indicative of an event. The event can be an interactive opportunity for a user. For example, wireless communication circuitry of a cradle can receive the data indicative of the event, such as over a network from a remote computing system, an associated user device, a nearby interactive object and/or other devices.

At 930, the method 900 can include determining a levitation or levitation-like motion sequence based at least in part on the data indicative of the event. For example, the levitation or levitation-like motion sequence can be a particular movement pattern associated with and/or indicative of the event. For example, each specific event or each type of event can have an associated levitation or levitation-like motion sequence. In some implementations, the levitation or levitation-like motion sequence can further be determined based on other criteria, such as a proximity of another user/interactive object, a proximity of a specific user, a classification of another user, a charge level of an interactive object, a time period, and/or other criteria.

At 940, the method 900 can include controlling a solenoid coil of the cradle to induce a magnetic field to cause an interactive object to move according to the levitation or levitation-like motion sequence. As an example, a controller of the cradle can control an electrical current waveform type (e.g., square wave, sinewave, triangular wave, etc.), a duty cycle of the electrical current in electrical current frequency, an amplitude of the electrical current, a direction of the electrical current, and/or other aspects of an electrical current provided to the solenoid. In response, the magnetic field induced by the solenoid coil can cause the interactive object (e.g., toy wand) to levitate according to the motion sequence.

For example, the controller can control at which position the interactive object levitates (e.g., positions depicted in FIGS. 5-7), how the interactive object moves between positions (e.g., how quickly or slowly) whether and how the interactive object bounces (e.g., slightly trembling versus bouncing vigorously), pauses between movement (e.g., periods at which the interactive object achieves an equilibrium or near-equilibrium levitation state), and/or other movement of an interactive object.

In some implementations, the event can be a global event received from a remote computing system. As an example, the remote computing system can communicate data indicative of the event to a plurality of interactive objects. For example, on a special day in a "magical land," the remote computing system can communicate a notification to a plurality of network-connected interactive objects (e.g., a plurality of toy wands in their respective cradles) regarding the event. The event can be, for example, an opportunity for the user to engage with the user's environment. For example, on the birthday of the king of the "magical land," each user can be notified of the event and sent on a "quest" to perform particular activities to obtain a gift for the king. In response to receiving the data indicative of the global event, the controller of a cradle can cause an interactive object to levitate according to a levitation or levitation-like motion sequence, which can notify a user of the event. For example, a toy wand can "bounce" within the cradle to indicate that the event is occurring. In some implementations, the movement of the interactive object can indicate to a user that the user should obtain additional information about the event, such as via the user's associated computing device (e.g., smartphone).

In some implementations, the event can include data indicative that a plurality of interactive objects is charged. For example, a specific user's cradle can receive a notification from a nearby cradle that a nearby user's toy wand has been charged. Further, the specific user's cradle can likewise send a notification to the nearby cradle that the specific user's toy wand is similarly charged. The event can thus be an opportunity for the specific user and the nearby user to interact with one another. For example, each respective cradle can cause an associated interactive object to levitate.

In some implementations, the event can include data indicative that another interactive object is nearby. For example, a specific user's toy wand can be positioned within the user's cradle when another user approaches carrying his/her own toy wand. As the nearby user approaches, his/her toy wand can periodically communicate a notification that the toy wand is nearby (e.g., a BLE advertisement packet) which can be received by the specific user's cradle and/or toy wand. The event can thus be an opportunity for the specific user to interact with the nearby user.

In some implementations, the levitation or levitation-like motion sequence can be further determined based lease part on a classification of the nearby interactive object. For example, a "friendly" nearby interactive object (e.g., another interactive object on the user's team or from the user's house) can have a first associated levitation or levitation-like motion sequence, while an "unfriendly" nearby object (e.g., an interactive object from a rival team or house) can have a second associated levitation or levitation-like motion sequence. The specific levitation or levitation-like motion sequence can thus notify a user of the classification of the nearby interactive object.

In some implementations, the event can include a determination that a time period greater than a threshold has elapsed since the interactive object was removed from the cradle. As an example, the cradle (e.g., a controller of the cradle) can monitor when a user removes the toy wand from the cradle. In some implementations, if greater than a threshold time period has elapsed since the user last removed the toy wand, the cradle (e.g., the controller of the cradle) can determine that the user should be notified of the time period elapsing. As an example, the longer that the toy wand has been in the cradle, the toy wand can begin moving more vigorously (e.g., bouncing higher) indicating that the toy wand is "impatient" or "restless" due to the time lapse.

In some implementations, the event can include a determination that a charge level of an interactive object is below a threshold. As an example, when a user places a toy wand in the cradle, the cradle can be configured to determine that the charge level of the toy wand is less than a threshold. In some implementations, the toy wand can communicate a charge level of the toy wand to the cradle. In response, the cradle can control the interactive object to move to a particular position, such as a position used for charging the interactive object.

In some implementations, the event can include data indicative that the interactive object is in the process of charging. As an example, while the interactive object is charging, the cradle can retain the interactive object in a particular position (e.g., a charging position).

In some implementations, should a user attempt to remove the interactive object from the cradle prior to completion of charging a battery of the interactive object, the controller can cause a levitation or levitation-like motion sequence indicative of an incomplete charge of the battery of the interactive object. For example, the controller can induce an attractive magnetic force which can resist the user removing the interactive object from the cradle.

In some implementations, the event can include data indicative that the interactive object has completed charging. For example, while the interactive object is charging, the cradle can retain the interactive object at a particular position (a charging position). However, upon completion of charging the interactive object, the cradle can cause the interactive object to move to a non-charging position (e.g., a levitating position).

In this way, the cradle can control a levitation or levitation-like motion of an interactive object, thereby communicating information about various events to a user.

Figure 10:
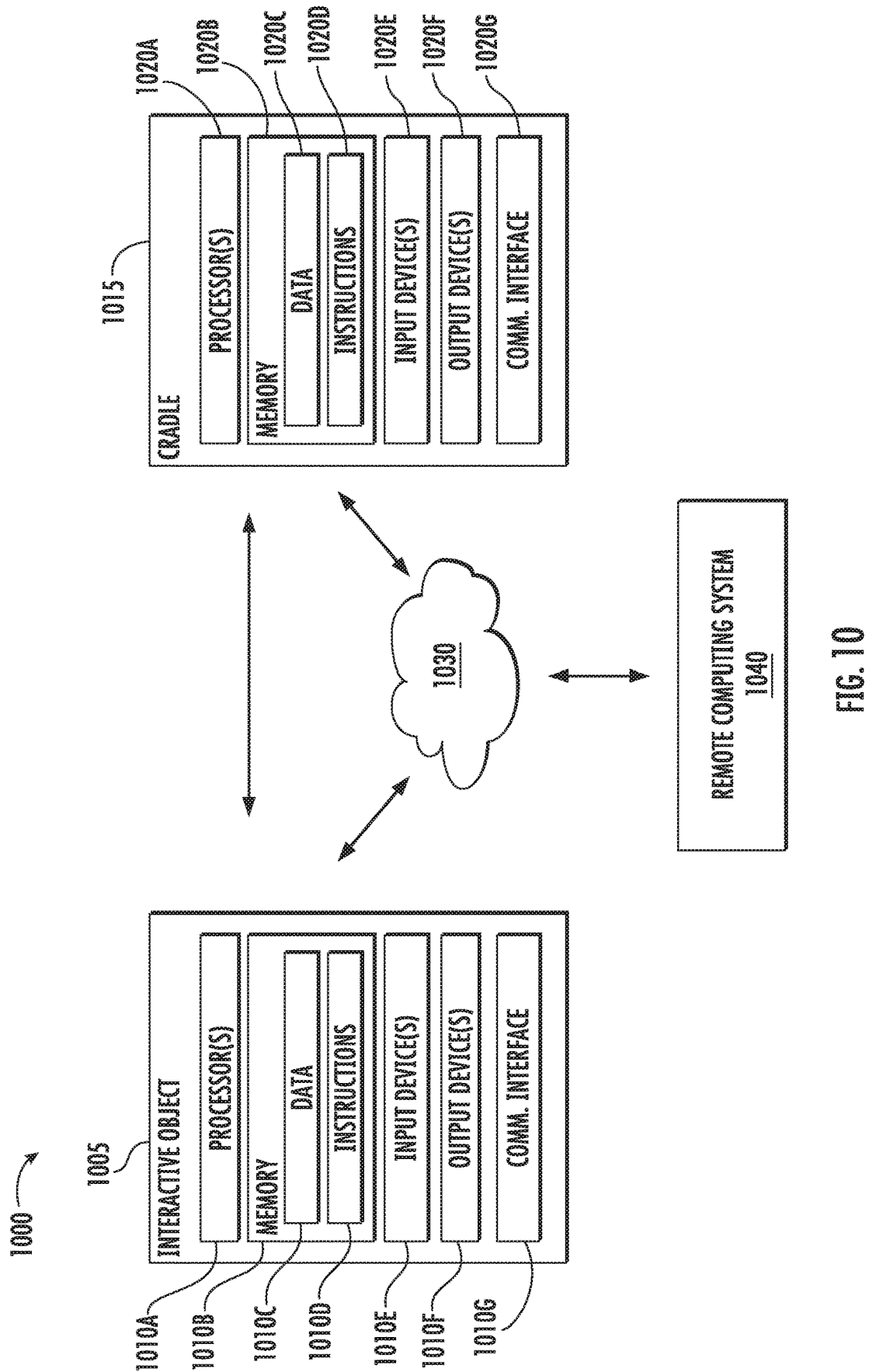
FIG. 10 depicts example components of an example computing system according to example aspects of the present disclosure.

Referring now to FIG. 10, example components of an example computing system 1000 according to example aspects of the present disclosure are depicted. The system 1000 can include an interactive object 1005, a cradle 1015, and a remote computing system 1040. The interactive object 1005 and cradle 1015 can correspond to interactive objects and cradles as described herein. The interactive object 1005 and the cradle 1015 can communicate via one or more near range communication protocols (e.g., BLE, infrared signals, etc.). In some implementations, the system 1000 can include one or more remote computing systems 1040 (e.g., cloud-based server systems, etc.). The interactive object 1005, the cradle 1015, and/or the remote computing computing(s) 1040 can be configured to communicate via one or more network(s) 1030.

The interactive object 1005 can include one or more computing device(s). The computing device(s) can include one or more processor(s) 1010A and one or more memory device(s) 1010B. The one or more processor(s) 1010A can be any suitable processing device (e.g., a processor core, a microprocessor, an ASIC, a FPGA, a controller, a microcontroller, etc.) and can be one processor or a plurality of processors that are operatively connected. The memory device(s) 1010B can include one or more non-transitory, computer-readable media that collectively store instructions that when executed by the one or more processors 1010A (the interactive object 1005) cause the one or more processors 1010A (the interactive object 1005) to perform operations. The memory device(s) 1010B can include one or more non-transitory, computer-readable storage media, such as RAM, ROM, EEPROM, EPROM, flash memory devices, magnetic disks, etc., and/or combinations thereof.

The memory device(s) 1010B can store information accessible by the one or more processor(s) 1010A, including computer-readable instructions 1010D that can be executed by the one or more processor(s) 1010A. The instructions 1010D can be any set of instructions that when executed by the one or more processor(s) 1010A, cause the one or more processor(s) 1010A (the interactive object 1005) to perform operations. In some embodiments, the instructions 1010D can be executed by the one or more processor(s) 1010A to cause the one or more processor(s) 1010A (the interactive object 1005) to perform operations, such as any of the operations and functions of an interactive object (and/or its hardware components) or for which the interactive object 1005 (and/or its hardware components) are configured, as described herein, one or more portions of any of the methods/processes described herein (e.g., methods 800, 900) and/or any other operations or functions, as described herein. The instructions 1010D can be software written in any suitable programming language or can be implemented in hardware. Additionally, and/or alternatively, the instructions 1010D can be executed in logically and/or virtually separate threads on processor(s) 1010A.

The one or more memory device(s) 1010B can also store data 1010D that can be retrieved, manipulated, created, or stored by the one or more processor(s) 1010A. The data 1010D can include, for instance, data indicative of user input, data indicative of a pairing communication, data indicative of an interactive object identifier, data indicative of a paring output signal, sensor data, data indicative of an interactive object action, data associated with an unpairing action, algorithms and/or models, battery data, proximity data, classification data, event data and/or other data or information. The data 1010D can be stored in one or more database(s). The one or more database(s) can be connected to the interactive object 1005 by a data channel, by a high bandwidth LAN or WAN, or can also be connected to the interactive object 1005 through network(s) 1030. The one or more database(s) can be split up so that they are located in multiple locales.

The interactive object 1005 can also include a communication interface 1010G used to communicate with one or more other component(s) of the system 1000 including, for example, near range and/or over the network(s) 1030. The network interface 1010G can include any suitable components for interfacing with one or more network(s), including for example, transmitters, receivers, ports, controllers, antennas, chips, or other suitable components.

The interactive object 1005 can include one or more input devices(s) 1010E and/or one or more output devices(s) 1010E. The input devices(s) 1010E can include, for example, hardware and/or software for receiving information from a user (e.g., user input) and/or another device. This can include, for example, one or more sensors (e.g., infrared receivers, inductive sensors, IMUs, etc.), buttons, touch screen/pad, data entry keys, a microphone suitable for voice recognition, etc. The output device(s) 1010F can include hardware and/or software for visually or audibly producing signals. For instance, the output device(s) 1010F can include one or more infrared transmitters, lighting elements (e.g., LED, etc.), display device, one or more speaker(s), etc.

The cradle 1015 can be any suitable type of computing device, as described herein. A cradle 1015 can include one or more processor(s) 1020A and one or more memory device(s) 1020B. The one or more processor(s) 1020A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 1020B can include one or more non-transitory, computer-readable media that collectively store instructions that when executed by the one or more processors 1020A (the cradle 1015) cause the one or more processors 1020A (the cradle 1015) to perform operations. The memory device(s) 1020B can include one or more non-transitory, computer-readable storage media, such as RAM, ROM, EEPROM, EPROM, flash memory devices, magnetic disks, etc., and/or combinations thereof.

The memory device(s) 1020B can include one or more computer-readable media and can store information accessible by the one or more processor(s) 1020A, including instructions 1020D that can be executed by the one or more processor(s) 1020A. For instance, the memory device(s) 1020B can store instructions 1020D for running one or more software applications, displaying a user interface, receiving user input, processing user input, pairing/unpairing with an interactive object, performing user device actions, receiving and processing event data, determining motion sequences, controlling solenoid coils, etc. The instructions 1020B can be executed by the one or more processor(s) 1020A to cause the one or more processor(s) 1020A (the cradle 1015) to perform operations, one or more portions of any of the methods/processes described herein (e.g., method 800, 900), and/or any other operations or functions, as described herein, as described herein. The instructions 1020D can be software written in any suitable programming language or can be implemented in hardware. Additionally, and/or alternatively, the instructions 1020D can be executed in logically and/or virtually separate threads on processor(s) 1020A.

The one or more memory device(s) 1020B can also store data 1020C that can be retrieved, manipulated, created, or stored by the one or more processor(s) 1020A. The data 1020C can include, for instance, data indicative of a user input, data indicative of user input, data indicative of a pairing communication, data indicative of an interactive object identifier, data indicative of a paring output signal, sensor data, data indicative of an interactive object action, data associated with an unpairing action, data indicative of home profile and/or one or more home privileges, data indicative of a visitor profile and/or one or more visitor privileges, algorithms and/or models, battery data, proximity data, classification data, event data, levitating position data, motion sequence data, and/or other data or information. In some implementations, the data 1020C can be received from another device.

The cradle 1015 can also include a network interface 1020G used to communicate with one or more other component(s) of system 1000 (e.g., an interactive object 1005) via near range communication and/or over the network(s) 1030. The network interface 1020G can include any suitable components for interfacing with one or more network(s), including for example, transmitters, receivers, ports, controllers, antennas, or other suitable components.

The cradle 1015 can include one or more input devices(s) 1020E and/or one or more output devices(s) 1020E. The input devices(s) 1020E can include, for example, hardware and/or software for receiving information from a user, such as a touch screen, touch pad, mouse, data entry keys, speakers, a microphone suitable for voice recognition, etc. In some implementations, the input device(s) 1020E can include sensor(s) for capturing sensor data (E.g., associated with a pairing output signal, interactive object action, etc.). The output device(s) 1020F can include hardware and/or software for visually or audibly producing information/ signals for a user. For instance, the output device(s) 1020F can include one or more speaker(s), earpiece(s), headset(s), handset(s), etc. The output device(s) 1020F can include a display device, which can include hardware for displaying a user interface and/or messages for a user. By way of example, the output component 1020F can include a display screen, CRT, LCD, plasma screen, touch screen, TV, projector, and/or other suitable display components. In some implementations, the cradle 1015 may not include a display device.

The network(s) 1030 can be any type of communications network, such as a local area network (e.g. intranet), wide area network (e.g. Internet), cellular network, or some combination thereof and can include any number of wired and/or wireless links. The network(s) 1030 can also include a direct connection between one or more component(s) of system 1000. In general, communication over the network(s) 1030 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A network-connected toy wand system, comprising:
a toy wand, comprising:
a shaft portion having at least one magnetically-reactive element inside; and
a handle; and
a cradle configured to receive and hold the toy wand, comprising:
a body that is shaped to form an opening therethrough sufficient to accommodate the shaft portion;
a solenoid coil formed proximate the opening;
electrical circuitry configured to cause an electrical current to flow in the solenoid coil;
wireless communication circuitry; and
a controller coupled to the wireless communication circuitry and the electrical circuitry and configured to control the timing and amount of electrical current flowing through the solenoid coil;
wherein upon the occurrence of a predetermined event, the controller causes electrical current to flow in the solenoid coil that causes levitation or levitation-like movement of the toy wand within said opening by virtue of electromagnetic interaction with the magnetically-reactive element of the shaft portion.

2. The network-connected toy wand system of claim 1, wherein the predetermined event comprises receipt by the wireless communication circuitry of an external command to instantiate the levitation movement.

3. The network-connected toy wand system of claim 1, wherein the toy wand further comprises a battery; and
wherein the toy wand and the cradle are further configured to charge the battery.

4. The network-connected toy wand system of claim 1, wherein the cradle is configured to control the solenoid coil so as to forcibly retain the toy wand within the opening at a first position during battery charging; and
wherein the cradle is configured to control the solenoid coil so as to release the toy wand when charging is complete, thereby causing the toy wand to levitate at one or more second positions.

5. The network-connected toy wand system of claim 1, wherein the toy wand and the cradle are configured for wireless charging; and
wherein the solenoid is further configured to wirelessly charge the battery when the toy wand is in the first position.

6. The network-connected toy wand system of claim 1, wherein the toy wand and the cradle are configured for wireless charging;
wherein the solenoid comprises a first solenoid at a first orientation on the cradle;

wherein the cradle further comprises a second solenoid at a second orientation on the cradle configured for wireless charging; and
wherein the second solenoid is configured to wirelessly charge the battery while the first solenoid forcibly retains the toy wand at the first position.

7. The network-connected toy wand system of claim 1, wherein the first position comprises a levitating position in which the toy wand is generally suspended within the opening of the cradle.

8. The network-connected toy wand system of claim 1, wherein the cradle comprises one or more electrical charging contacts configured to provide a charging current;
wherein the toy wand comprises one or more corresponding electrical charging contacts configured to receive the charging current; and
wherein, when the toy wand is in the first position, the one or more electrical charging contacts of the cradle and the one or more corresponding electrical charging contacts of the toy wand are configured to provide the charging current to charge the battery.

9. The network-connected toy wand system of claim 1, wherein the magnetically-reactive element of the toy wand comprises a permanent magnet.

10. The network-connected toy wand system of claim 1, wherein the magnetically-reactive element of the toy wand comprises an electromagnet.

11. The network-connected toy wand system of claim 1, wherein the controller is configured to control the timing and amount of electrical current flowing through the solenoid coil by controlling at least one of a type of a current waveform, a frequency of the current waveform, a duty cycle of the current waveform, a direction of a current, or an amplitude of a current.

12. The network-connected toy wand system of claim 1, wherein the cradle further comprises a permanent magnet;
wherein the permanent magnet is configured to cause the toy wand to levitate at a first position due an opposing magnetic force between the magnetically-reactive element and the permanent magnet;
wherein the permanent magnet is configured to cause the toy wand to be forcibly retained at a second position due to an attractive magnetic force between the magnetically-reactive element and the permanent magnet.

13. A network-connected interactive object charging system, comprising:
an interactive object, comprising:
a casing; and
a first magnet disposed within the casing; and
a cradle, comprising:
a body that is shaped to form an opening therethrough sufficient to accommodate at least a portion of the casing;
a solenoid coil formed around the opening;
electrical circuitry configured to cause an electrical current to flow in the solenoid coil; and
a controller coupled to the electrical circuitry for controlling the timing and amount of electrical current flowing through the solenoid coil;
wherein the cradle is configured to impart a first magnetic force such that when the interactive object is positioned within the cradle at a first levitating position, the cradle causes a first magnetically-induced levitation of the interactive object due to the first magnetic force opposing the first magnet of the interactive object;
wherein the cradle is further configured to impart a second magnetic force such that when the interactive object is positioned within the cradle at a second levitating position, the cradle causes a second magnetically-induced levitation of the interactive object due to the second magnet force attracting the first magnet of the interactive object; and wherein the controller is configured to control the electrical current in the solenoid coil to cause the interactive object to move between the first levitating position and the second levitating position.

14. The network-connected interactive object charging system of claim 13, wherein the interactive object further comprises first charging circuitry;

wherein the cradle further comprises second charging circuitry and wireless communication circuitry;

wherein upon receipt by the wireless communication circuitry of an external command to instantiate charging, the controller is configured to control the interactive object to the second levitating position; and wherein when the interactive object is in the second levitating position, the second charging circuitry is configured to provide charging to the interactive object via first charging circuitry of the interactive object.

15. The network-connected interactive object charging system of claim 13, wherein upon completion of charging the interactive object to a threshold level or upon receipt by the wireless communication circuitry of an external command to cease charging, the controller is configured to control the interactive object to the first levitating position.

16. The network-connected interactive object charging system of claim 13, wherein the second charging circuitry is configured to provide charging to the first charging circuitry via at least one of wireless charging via the solenoid coil, wireless charging via a dedicated wireless charging coil, or direct charging via one or more corresponding electrical contacts of the cradle and the interactive object.

17. The network-connected interactive object charging system of claim 13, wherein the cradle further comprises one or more second magnets positioned around the opening; and wherein the one or more second magnets are configured to provide at least a portion of the first magnetic force or the second magnetic force.

18. The network-connected interactive object charging system of claim 13, wherein the one or more second magnets comprise one or more permanent disc magnets.

19. The network-connected interactive object charging system of claim 13, wherein the solenoid coil is configured to provide at least a portion of the first magnetic force or the second magnetic force; and wherein the controller is further configured to control the solenoid coil to induce at least a portion of the first magnetic force or the second magnetic force.

20. The network-connected interactive object charging system of claim 13, wherein the controller is further configured to control a magnetic field induced by the solenoid coil such that the induced magnetic field and the first magnetic force or the second magnetic force cooperate to cause levitation motion in the interactive object; and wherein the levitation or levitation-like motion comprises a movement of the interactive object from the first levitating position or the second levitating position to one or more third levitating positions.

* * * * *